US010803625B2

(12) United States Patent
Wu

(10) Patent No.: US 10,803,625 B2
(45) **Date of Patent: *Oct. 13, 2020**

(54) DETECTION SYSTEM AND PICTURING FILTERING METHOD THEREOF

(71) Applicant: PixArt Imaging Inc., Hsin-Chu County (TW)

(72) Inventor: Chung-Yuo Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,419

(22) Filed: May 31, 2019

(65) Prior Publication Data

US 2019/0287272 A1 Sep. 19, 2019

Related U.S. Application Data

(63) Continuation of application No. 15/813,935, filed on Nov. 15, 2017, now Pat. No. 10,354,413, which is a continuation of application No. 14/330,058, filed on Jul. 14, 2014, now Pat. No. 9,852,519, which is a continuation-in-part of application No. 13/926,560, filed on Jun. 25, 2013, now Pat. No. 9,684,840.

(51) Int. Cl.

| | |
|---|---|
| ***G06T 7/90*** | (2017.01) |
| ***H04N 5/33*** | (2006.01) |
| ***G06K 9/20*** | (2006.01) |
| ***G06K 9/00*** | (2006.01) |
| ***H04N 5/225*** | (2006.01) |
| *H04N 5/222* | (2006.01) |

(52) U.S. Cl.

CPC ........... *G06T 7/90* (2017.01); *G06K 9/00355* (2013.01); *G06K 9/2018* (2013.01); *G06K 9/2027* (2013.01); *H04N 5/2256* (2013.01); *H04N 5/332* (2013.01); *H04N 5/2226* (2013.01)

(58) Field of Classification Search

None

See application file for complete search history.

(56) References Cited

U.S. PATENT DOCUMENTS

2007/0058860 A1 * 3/2007 Harville ............ G06K 9/00234 382/167

* cited by examiner

*Primary Examiner* — Frederick D Bailey

(74) *Attorney, Agent, or Firm* — WPAT, PC

(57) ABSTRACT

A detection system including a light source, an image sensor and a processor is provided. The light source is configured to illuminate an object. The image sensor is configured to output a picture. The processor is configured to generate an IR picture and a color picture according to the picture captured by the image sensor, identify a skin-color object in the color picture and determine an object image in the IR picture according to the skin-color object.

20 Claims, 14 Drawing Sheets

14

1

12

16

18

IR picture

| 0 | 0 | 0 | 0 | 0 | 0 | 0 | 0 | 0 | 0 | 0 |  |  |  | 0 | 0 |
|---|---|---|---|---|---|---|---|---|---|---|---|---|---|---|---|
|  |  |  |  |  |  |  |  |  |  |  |  |  |  | 0 | 0 |
|  |  |  |  |  |  |  |  |  |  |  |  |  |  | 0 | 0 |
| 0 | 0 | 0 |  |  |  |  |  |  |  |  |  |  |  | 0 | 0 |
| 0 | 0 | 0 | 0 |  |  |  |  |  |  |  |  |  |  | 0 | 0 |
| 0 | 0 | 0 | 0 | 0 |  |  | 0 | 0 |  |  |  |  |  | 0 | 0 |

FIG. 12A color picture

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
|  |  |  |  |  |  |  |  |  |  | 0 | 0 | 0 | 0 | 0 | 0 |
|  |  |  |  |  |  |  |  |  |  | 0 | 0 | 0 | 0 | 0 | 0 |
| 0 | 0 | 0 |  |  |  |  |  |  |  | 0 | 0 | 0 | 0 | 0 | 0 |
| 0 | 0 | 0 | 0 |  |  |  |  |  |  | 0 | 0 | 0 | 0 | 0 | 0 |
| 0 | 0 | 0 | 0 | 0 |  |  | 0 | 0 | 0 | 0 | 0 | 0 | 0 | 0 | 0 |

FIG. 12B

DETECTION SYSTEM AND PICTURING FILTERING METHOD THEREOF

CROSS-REFERENCE TO RELATED APPLICATION

The present application is a continuation application of U.S. Ser. No. 15/813,935, filed on Nov. 15, 2017, which is a continuation application of U.S. Ser. No. 14/330,058, filed on Jul. 14, 2014, which is a continuation-in-part application of U.S. Ser. No. 13/926,560, filed on Jun. 25, 2013, the disclosures of which are hereby incorporated by reference herein in their entirety.

BACKGROUND

1. Technical Field

The present invention relates to a detection system, and more particularly, to an image detection system.

2. Related Art

An image sensor usually has a plurality of sensing elements, which can convert light into voltages. The voltages can then be converted into digital information forming pictures by a peripheral circuit.

An image sensor can be used to track an object. The image sensor can capture images of an object and generate a plurality of pictures, and the status of the object can be tracked by analyzing the change of the object image in the pictures.

An image sensor can receive light reflected from an object to generate a picture containing a bright object image. However, in addition to the light reflected from the object, the image sensor receives environmental light when capturing images. In some situations, environmental light may cause a portion of the background of a picture to have high intensity, which may interfere with the determination of an object image. Furthermore, if a picture includes the image of a reflective background object, the image of the reflective background object may interfere with the determination of object images as well. In addition, the image of a background object in a picture may be a source of interference, which may adversely affect the determination of an object image. Thus, in order to accurately determine an object image, the interferences caused by the background and environmental light shall be properly removed.

SUMMARY

In view of the above issues, several embodied detection systems are provided.

The present disclosure provides a detection system configured to detect an object and including an image sensor and a processor. The image sensor includes infrared pixels and color pixels and is configured to output a picture. The processor is configured to generate an IR picture and a color picture according to the picture received from the image sensor, wherein the IR picture contains an IR object image and the color picture contains a color object image, which corresponds to the IR object image in the IR picture, identify a skin-color object from the color object image in the color picture, and compare the identified skin-color object and the IR object image in the IR picture to remove a part of the IR object image, which does not correspond to the identified skin-color object of the color object image.

The present disclosure further provides a picture filtering method adapted to a detection system. The detection system includes an image sensor which has infrared pixels and color pixels. The picture filtering method includes the steps of: outputting, by the image sensor, a picture; generating an IR picture and a color picture according to the picture, wherein the IR picture contains an IR object image and the color picture contains a color object image, which corresponds to the IR object image in the IR picture; identifying an object shape of the IR object image in the IR picture; identifying a skin-color object from the color object image in the color picture when the object shape is not a predetermined shape; and filtering out a part of the IR object image, which does not correspond to the identified skin-color object of the color object image, from the identified object shape of the IR object image with the identified skin-color object.

The present disclosure further provides a detection system configured to detect an object. The detection system includes an image sensor and a processor. The image sensor includes a plurality of infrared pixels and a plurality of color pixels, and is configured to capture picture information of the object. The processor is configured to separate the picture information from the plurality of infrared pixels and the plurality of color pixels, wherein the picture information from the infrared pixels contains an IR object image and the picture information from the color pixels contains a color object image, which corresponds to the IR object image in the picture information from the infrared pixels, indicate skin-color pixels among the color object image, and compare the indicated skin-color pixels and the IR object image to remove a part of the IR object image, which does not correspond to the indicated skin-color pixels of the color object image, to obtain an adjusted IR object image for gesture recognition or object positioning.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which:

FIG. 12A shows an IR picture generated from a picture captured by a color image sensor;

FIG. 12B shows a color picture generated from a picture captured by a color image sensor;

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1A:
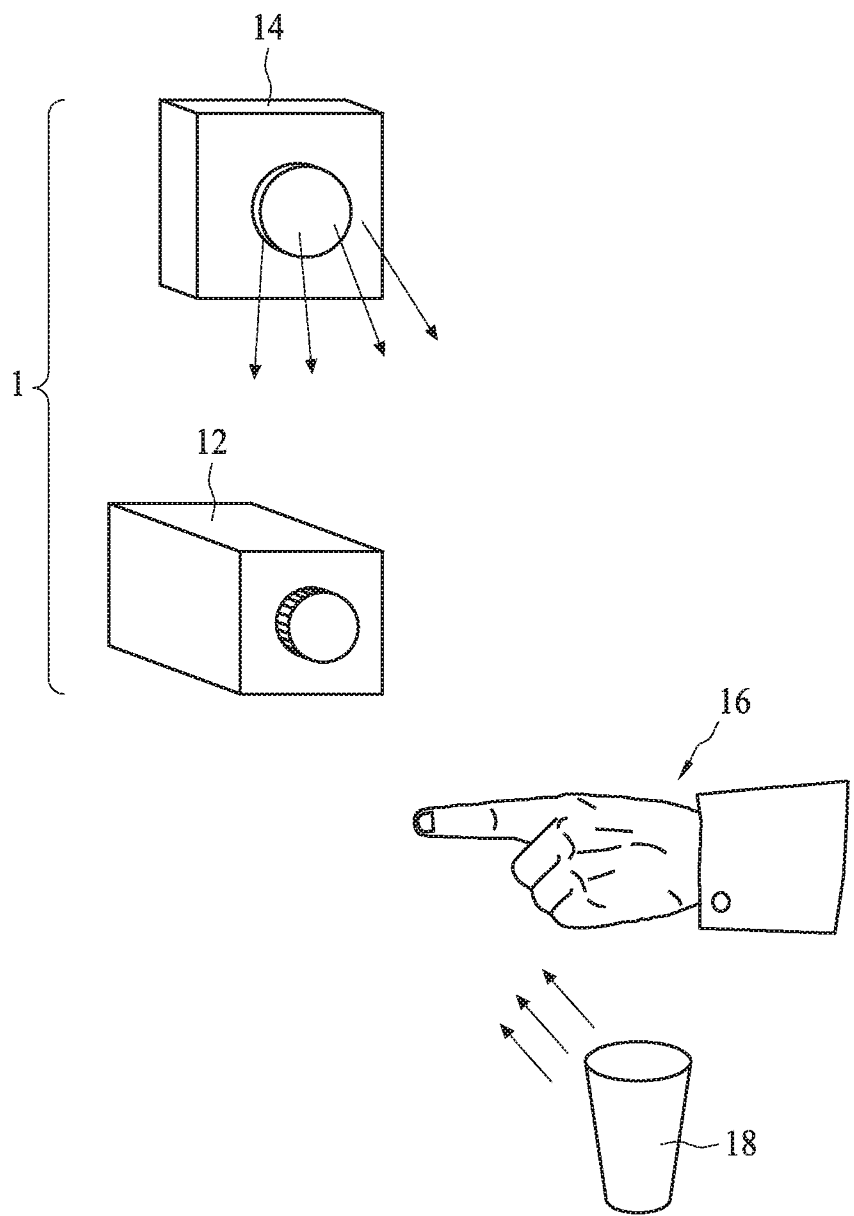
FIG. 1A schematically shows a detection system according to one embodiment of the present invention.
Figure 2:
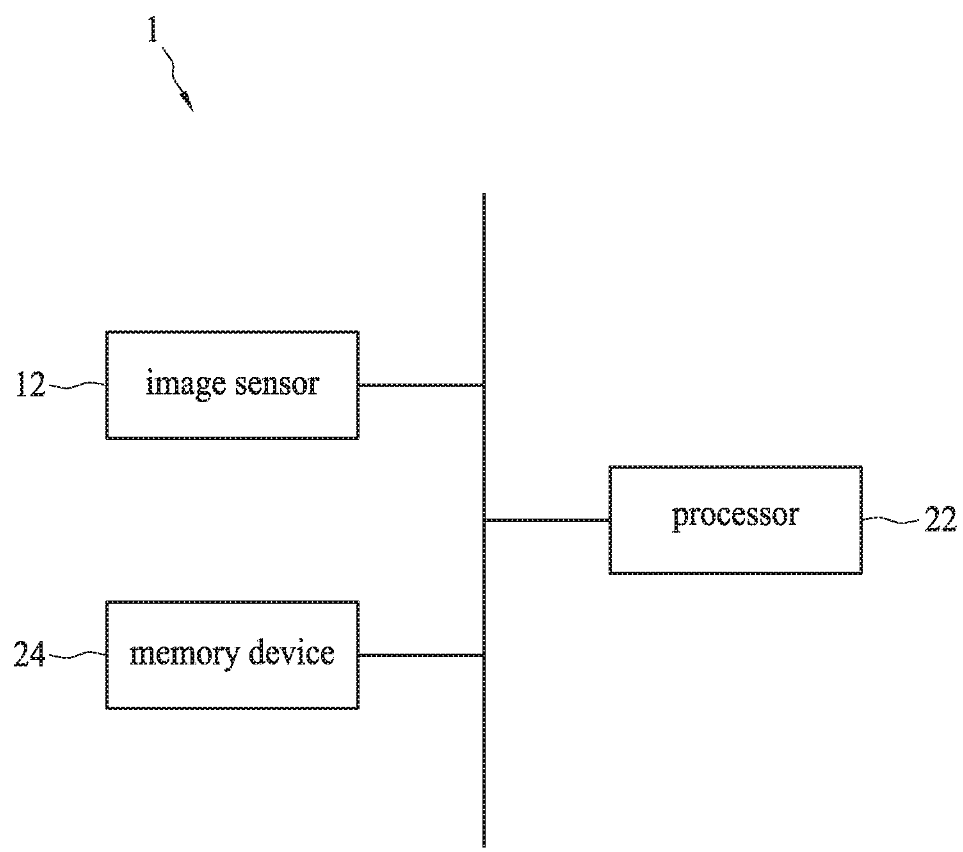
FIG. 2 is a block diagram schematically showing a detection system according to one embodiment of the present invention.

FIG. 1A schematically shows a detection system 1 according to one embodiment of the present invention. FIG. 2 is a block diagram schematically showing a detection system 1 according to one embodiment of the present invention. Referring to FIGS. 1A, and 2, the detection system 1 may include an image sensor 12, a light source 14, and a processor 22. The image sensor 12 can be configured to capture an image of an object 16. The light source 14 can be configured to illuminate the object 16 to allow the object 16 to form a bright object image on a picture generated by the image sensor 12. The processor 22 can be coupled with the image sensor 12 to process the pictures from the image sensor 12. The detection system 1 may further include a memory device 24, which can be configured as a storage for pictures from the image sensor 12.

Figure 1B:
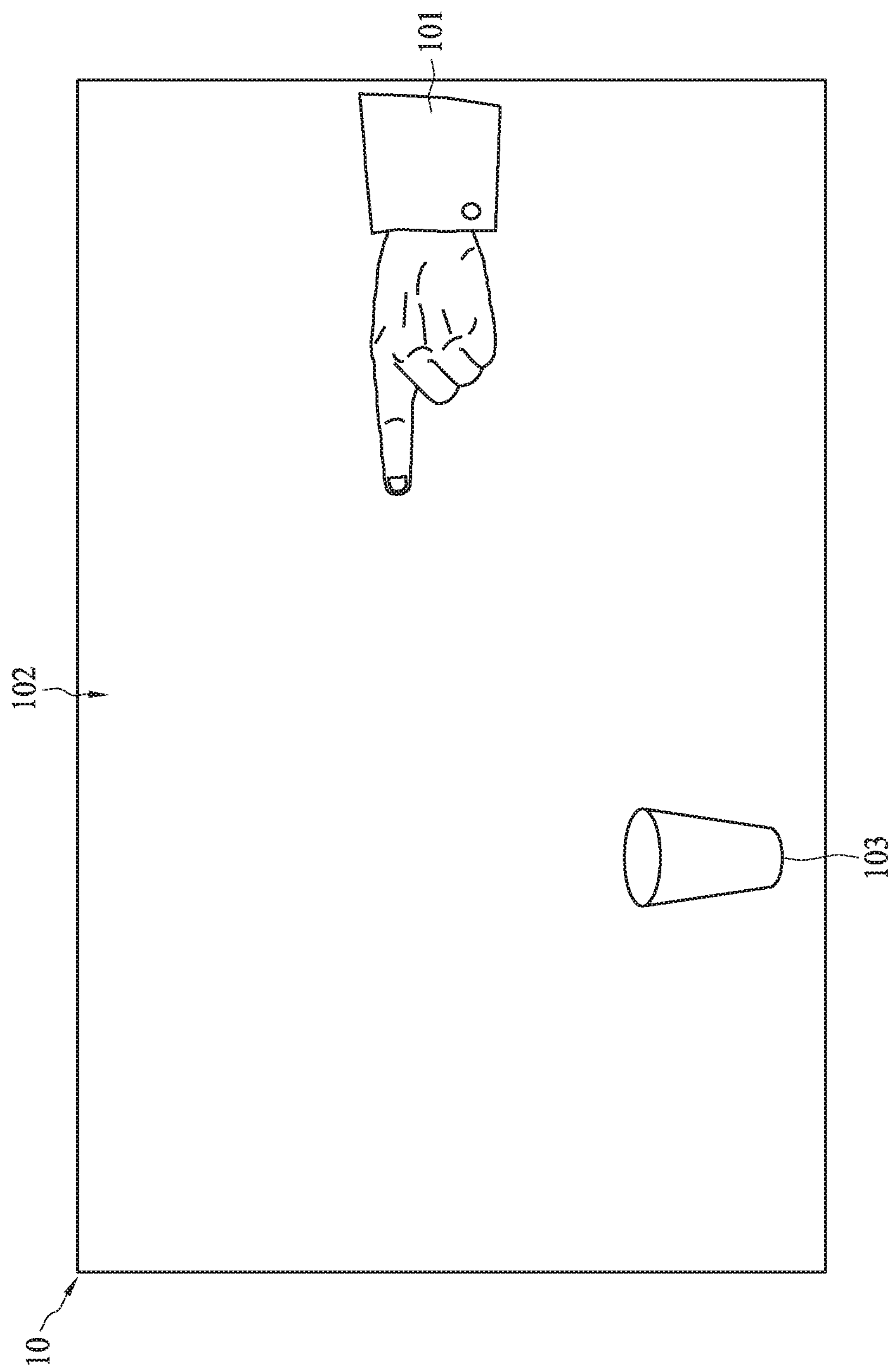
FIG. 1B schematically shows a picture according to one embodiment of the present invention.

FIG. 1B schematically shows a picture according to one embodiment of the present invention. Referring to FIGS. 1A and 1B, the image sensor 12 can take an image of the object 16 and generate a picture 10. The picture 10 may contain the image 101 of the object 16 and background image 102, in which the image 103 of a background object 18 may be a part of the background image 102.

The object 16 can be any physical object, which is not limited to a hand illustrated in the present embodiment.

The image sensor 12 may be a CMOS image sensor, CCD image sensor, or the like. The image sensor 12 can capture images at a high frame rate, such as 960 fps.

Figure 3:
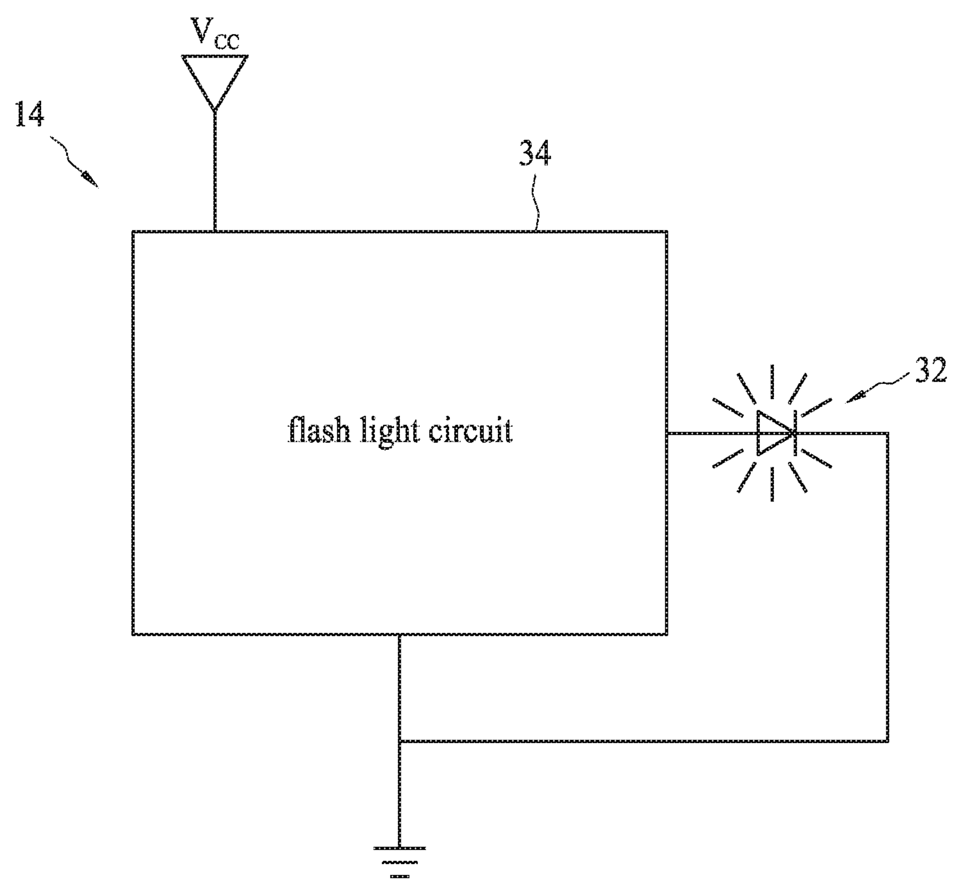
FIG. 3 is a functional diagram of a light source according to one embodiment of the present invention.

Referring to FIG. 3, the light source 14 may include a light-emitting element 32, which may be a light bulb, light emitting diode, or other suitable light sources. The light source 14 may further include a flash light circuit 34, which may be coupled with the light-emitting element 32. A power supply Vcc can provide the flash light circuit 34 with electrical power. The flash light circuit 34 can supply electrical pulses to the light-emitting element 32 to cause the light-emitting element 32 to flash at regular intervals.

The frequency of the light source 14 can be matched to the frame rate of the image sensor 12. As such, the object images intermittently appear in successively generated pictures.

Figure 4:
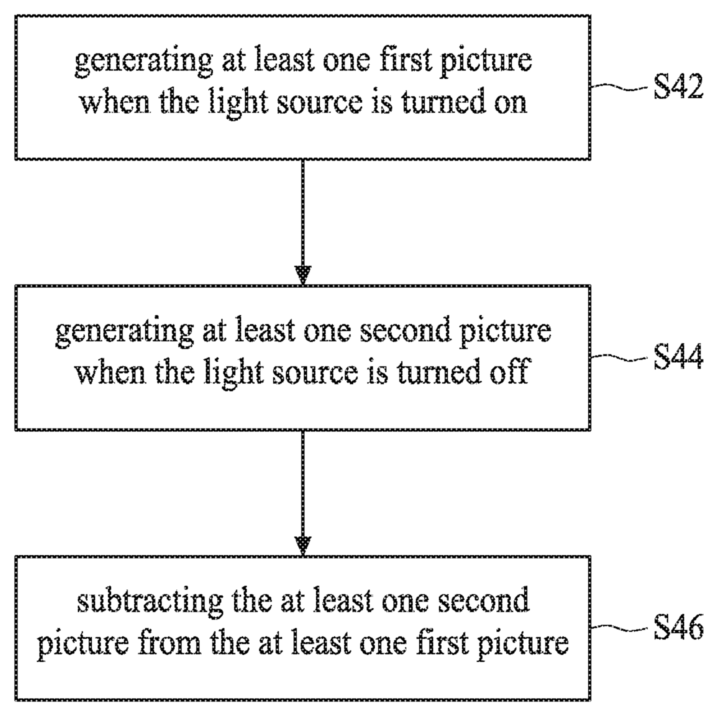
FIG. 4 is a flow diagram showing the steps of a method of removing background interferences according to one embodiment of the present invention.

FIG. 4 is a flow diagram showing the steps of a method of removing background interferences according to one embodiment of the present invention. Referring to FIGS. 1A to 4, when the image sensor 12 captures the image of the object 16, the image sensor 12 simultaneously receives environmental light. Furthermore, if there is a background object 18 located behind the object 16, the background object 18 may create an image on the pictures generated by the image sensor 12. The ambient light noise caused by the environmental light and the image created by the background object 18 under environmental light can be removed by the following steps.

In Step S42, the image sensor 12 generates at least one first picture (P1) when the light source 14 is turned on, wherein the at least one first picture (P1) may contain the image formed by the light of the light source 14 reflected from the object 16, the ambient light noise caused by the environmental light, and the image formed by the background object 18 illuminated by environmental light. In Step S44, the image sensor 12 generates at least one second picture (P2) when the light source 14 is turned off. Since the light source 14 is turned off, the at least one second picture (P2) does not include the image formed by the light of the light source 14 reflected from the object 16 while still including the ambient light noise caused by the environmental light and the image formed by the background object 18 illuminated by environmental light. In Step S46, the processor 22 subtracts the at least one second picture from the at least one first picture (P1-P2) to obtain a subtraction picture. The subtraction of the at least one second picture from the at least one first picture can remove the ambient light noise caused by the environmental light and the background image formed due to environmental light. As a result, the processor 22 can easily determine the object image created by the object 16 from the subtraction picture.

In some embodiments, the first picture includes a plurality of pixels, and the second picture includes a plurality of pixels corresponding to the pixels of the first picture, wherein the subtraction of the at least one second picture from the at least one first picture is performed by subtracting pixel data of each pixel of the second picture from pixel data of the corresponding pixel of the first picture.

In some embodiments, the pixel data may be of grey scale intensity. In some embodiments, the pixel data may be of one RGB component or a combination of at least two RGB components. In some embodiments, the pixel data may be of one HSV component or a combination of at least two HSV components. In some embodiments, the first and second pictures can be continuously generated.

In some embodiments, the processor 22 is configured to determine the position of the object image in the subtraction picture. In some embodiments, the processor 22 is configured to generate coordinate data according to the position of the object image.

In some embodiments, the image sensor 12 generates a plurality of first pictures when the light source 14 is turned on. The processor 22 calculates a plurality of subtraction pictures by subtracting the second picture from each first picture.

In some embodiments, the processor 22 can determine a distance between the object 16 and the image sensor 12 by a dimension of the object image measured from the subtraction picture. In some embodiments, the processor 22 can determine the change of distance between the object 16 and the image sensor 12 by the change of dimension measured from the subtraction picture. In some embodiments, the processor 22 can determine the gesture performed by the object 16 by the change of positions of the object image of the plurality of subtraction pictures. In some embodiments, the processor 22 can determine a distance or the change of distance between the object 16 and the image sensor 12 by the change of intensity of the object images in the plurality of subtraction pictures.

In some situations, after two pictures are subtracted, noises cannot be completely removed. At this moment, the detection system 1 may use more pictures to remove the interferences in the determination of the object image. In some embodiments, the image sensor 12 generates two first pictures when the light source 14 is turned on, and generates one second picture when the light source 14 is turned off. The processor 22 equalizes the two first pictures to obtain an average picture. The processor 22 then subtracts the second picture from the average picture. In some embodiments, the image sensor 12 generates one first picture when the light source 14 is turned on, and generates two second pictures when the light source 14 is turned off. The processor 22 equalizes the two second pictures to obtain an average picture. The processor 22 then subtracts the average picture from the first picture. In some embodiments, the method of using two first pictures and one second picture or using one first picture and two second pictures to remove the interferences in the determination of an object image can be applied with an image sensor 12 having a high frame rate of at least 960 fps such that an improved removal effect can be achieved.

Above all, other methods of removing the interferences caused by environmental light are provided below.

Figure 8:
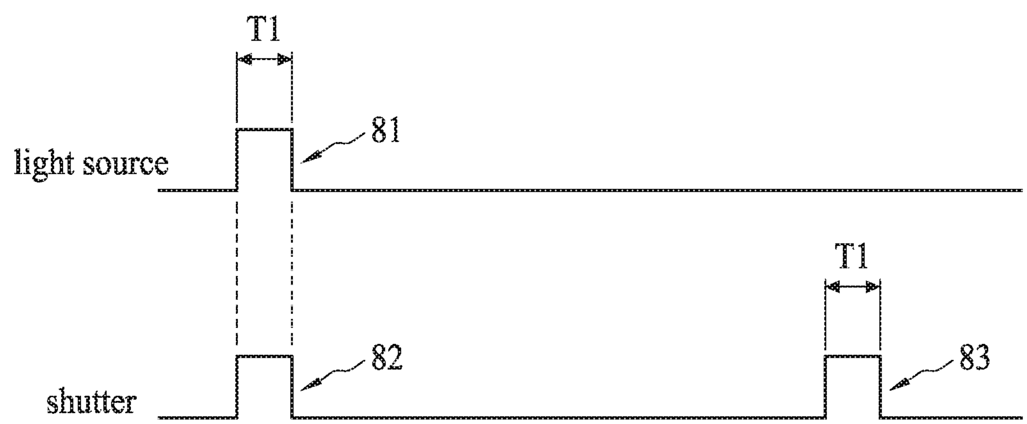
FIG. 8 is a timing diagram of the operations of a light source and the electronic shutter of an image sensor according to one embodiment of the present invention.

FIG. 8 is a timing diagram of the operations of a light source and the electronic shutter of an image sensor according to one embodiment of the present invention. As shown in FIG. 8, a signal 81 is provided for a light source, and simultaneously, a shutter open signal 82 is provided for an image sensor so that the image sensor generates a first picture (Image1) under the illumination of the light source and environmental light. The signal 81 and the signal 82 can have the same period T1, for example, milliseconds. When the light source is turned off, another shutter open signal 83 is provided for the image sensor such that the image sensor generates a second picture (Image2) under environmental light. The signal 83 can have a period of T1, for example, milliseconds. The interference caused by the environmental light can be removed by subtracting the second picture from the first picture (Image1-Image2).

Figure 9:
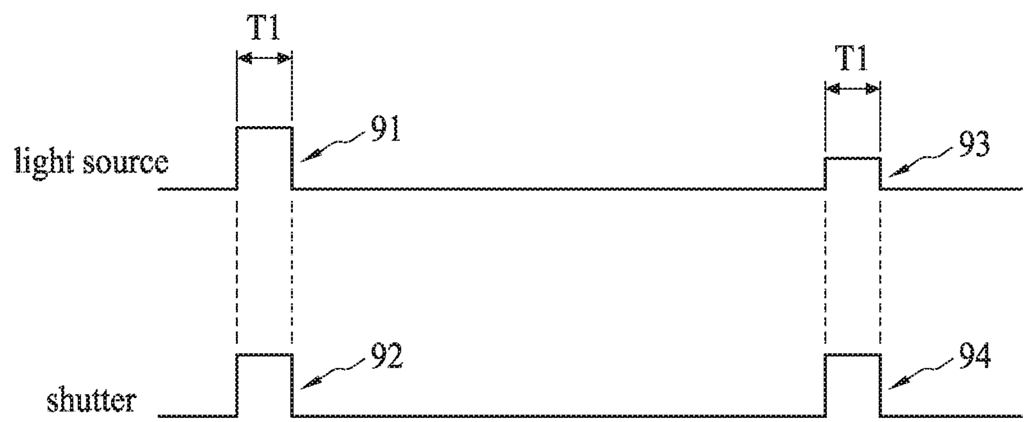
FIG. 9 is a timing diagram of the operations of a light source and the electronic shutter of an image sensor according to another embodiment of the present invention.

FIG. 9 is a timing diagram of the operations of a light source and the electronic shutter of an image sensor according to another embodiment of the present invention. As shown in FIG. 9, a signal 91 is provided for a light source, and simultaneously, a shutter open signal 92 is provided for an image sensor so that the image sensor generates a first picture (Image1) under the illumination of the light source and environmental light. The signal 91 and the signal 92 can have the same signal level and the same period T1, for example, milliseconds. Moreover, a signal 93 is provided for a light source, and simultaneously, a shutter open signal 94 is provided for an image sensor so that the image sensor generates a second picture (Image2) under the illumination of the light source and environmental light. The signal 93 and the signal 94 can have the same period T1, for example, milliseconds, but the signal level of the signal 91 is N times higher than that of the signal 93, where N is not equal to one. Using the following equation (1), a subtraction picture without interferences from environmental light can be obtained.

$$ObjectImage = (Image1 - Image2) \times \frac{N}{N-1} \quad (1)$$

Figure 10:
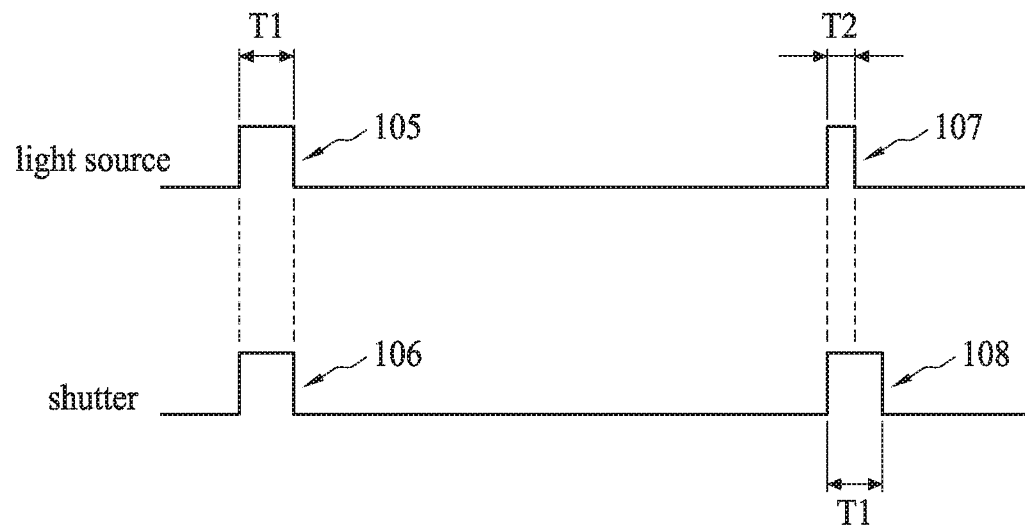
FIG. 10 is a timing diagram of the operations of a light source and the electronic shutter of an image sensor according to another embodiment of the present invention.

FIG. 10 is a timing diagram of the operations of a light source and the electronic shutter of an image sensor according to another embodiment of the present invention. As shown in FIG. 10, a signal 105 is provided for a light source, and simultaneously, a shutter open signal 106 is provided for an image sensor so that the image sensor generates a first picture (Image1) under the illumination of the light source and environmental light. The signal 105 and the signal 106 can have the same signal level and the same period of T1, for example, milliseconds. A signal 107 is provided for a light source, and simultaneously, a shutter open signal 108 is provided for an image sensor so that the image sensor generates a second picture (Image2) under the illumination of the light source and environmental light. The period T1 of the signal 105 can be N times higher than the period T2 of the signal 107, wherein N is not equal to one. The signal 1108 has a period of T1. A subtraction picture without interferences from environmental light can be obtained through the following equation (2).

$$ObjectImage = (Image1 - Image2) \times \frac{N}{N-1} \quad (2)$$

Figure 11:
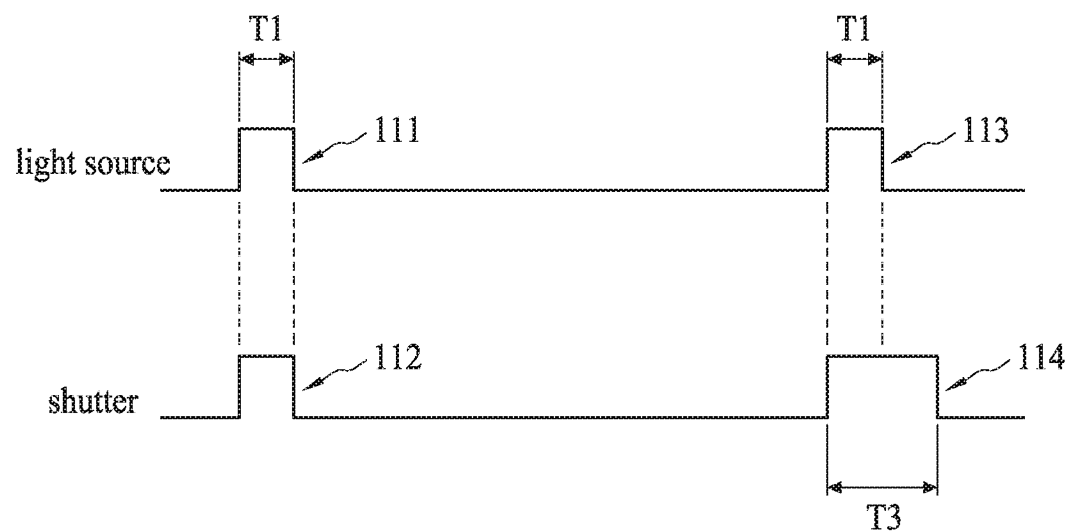
FIG. 11 is a timing diagram of the operations of a light source and the electronic shutter of an image sensor according to another embodiment of the present invention.

FIG. 11 is a timing diagram of the operations of a light source and the electronic shutter of an image sensor according to another embodiment of the present invention. As shown in FIG. 11, a signal 111 is provided for a light source, and simultaneously, a shutter open signal 112 is provided for an image sensor so that the image sensor generates a first picture (Image1) under the illumination of the light source and environmental light. The signal 111 and the signal 112 can have the same signal level and the same period of T1, for example, milliseconds. A signal 113 is provided for a light source, and simultaneously, a shutter open signal 114 is provided for an image sensor so that the image sensor generates a second picture (Image2) under the illumination of the light source and environmental light. The signal 113 can have a period of T1. The signal 114 has a period of T3 milliseconds, for example, wherein T3 is N times higher than T1, and N is not equal to one. The interferences from environmental light can be removed through the following equation (3).

$$\text{ObjectImage}=(\text{Image1}\times N-\text{Image2})/(N-1) \quad (3)$$

In some situations, the detection system 1 can utilize more pictures to remove the interferences affecting the determination of an object image. In some embodiments, the image sensor 12 generates a plurality of first pictures ($I_1, I_3, \ldots$) when the light source 14 is turned on, and generates a plurality of second pictures ($I_2, I_4, \ldots$) when the light source 14 is turned off, wherein the image sensor 12 alternately generates the first and second pictures ($I_1, I_2, I_3, \ldots, I_{N+3}$). The processor 22 uses the following equations (4) to (6) to calculate a computed picture ($I_{computed}$)

$$I_{computed} = \frac{1}{K}\sum_{i=1}^{N+3} \alpha_i \times I_i \quad (4)$$

$$\sum_{i=1}^{N+3} \alpha_i = 0 \quad (5)$$

$$K = \sum_{i=1}^{\left[\frac{(N+3)}{2}\right]} \alpha_{2\times i-1} \quad (6)$$

where N is a positive integer, and the absolute value of $|\alpha_{i1}|$ ($|\alpha_1|, \ldots, |\alpha_{N+3}|$) are binomial coefficients.

For example, in some embodiments, when N is equal to one, the image sensor 12 alternately generates two first pictures ($I_1$ and $I_3$) and two second pictures ($I_2$ and $I_4$). At this instance, $\alpha_i$ can be either (1, −3, 3, −1) or (−1, 3, −3, 1), and the computed picture ($I_{computed}$) can be:

$$I_{computed} = \frac{I_1 - 3I_2 + 3I_3 - I_4}{4}; \text{ or} \quad (7)$$

$$I_{computed} = \frac{-I_1 + 3I_2 - 3I_3 + I_4}{4} \quad (8)$$

In some embodiments, when N is two, $\alpha_i$ can be either (1, −4, 6, −4, 1) or (−1, 4, −6, 4, −1).

Referring back to FIGS. 1A and 1B, some non-object images may appear in the first picture(s) generated when the light source 14 is turned on, but do not appear in the second picture(s) when the light source 14 is turned off, and such non-object images cannot be removed using the aforementioned subtraction methods but they can be removed by a background model. Such non-object image may be formed by a background object 18 reflecting light from the light source 14 when it turned on or formed by the light reflected from the cloths of an operator.

Figure 5:
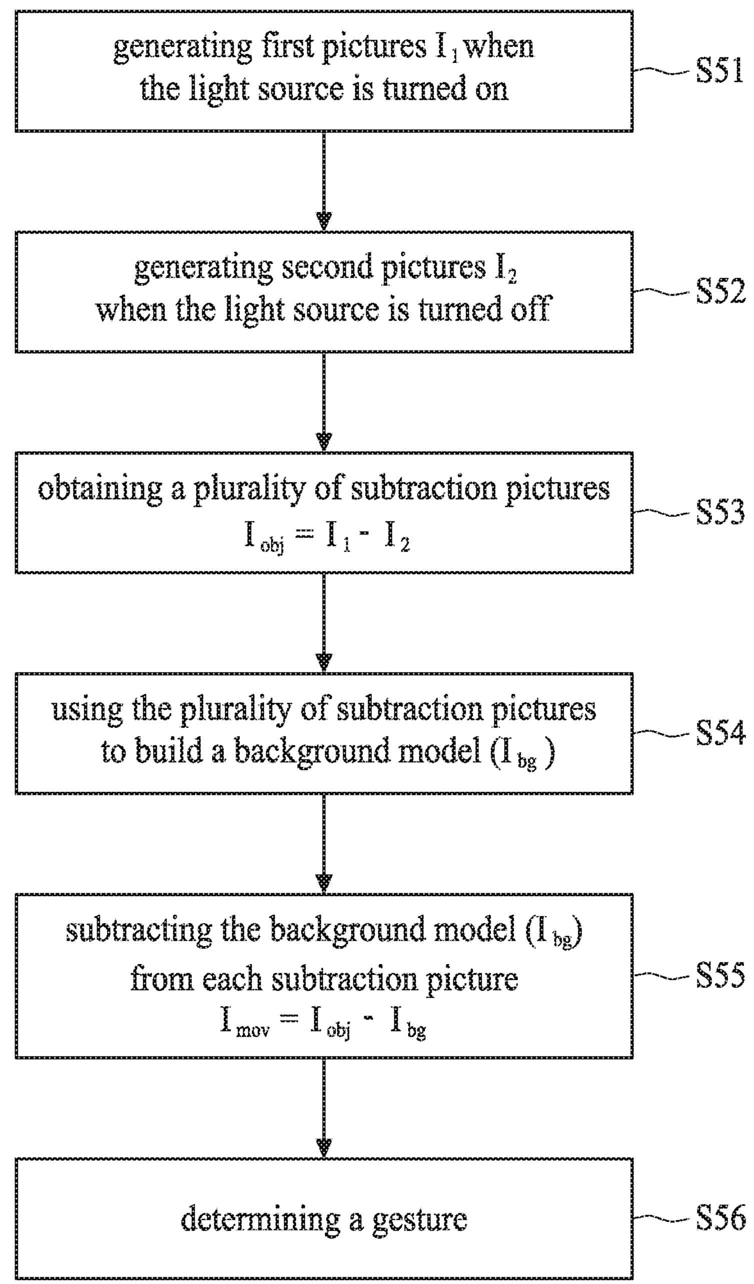
FIG. 5 is a flow chart showing a method of tracking a moving object or determining a gesture using pictures obtained when the light source is turned on and off.

FIG. 5 is a flow chart showing a method of tracking a moving object or determining a gesture using pictures obtained when the light source is turned on and off. In Step S51, a first picture ($I_1$) is generated when the light source is turned on. In Step S52, a second picture ($I_2$) is generated when the light source is turned off. In Step S53, a subtraction picture ($I_{obj}=I_1-I_2$) is obtained by subtracting the second picture ($I_2$) from the first picture ($I_1$). In Step S54, Steps S51 to S53 are repeated to obtain a plurality of subtraction pictures ($I_{obj}$). Next, the plurality of subtraction pictures ($I_{obj}$) is used to build a background model ($I_{bg}$). In some embodiments, the background model ($I_{bg}$) is built using the pixels that are significantly darker or unchanged in the plurality of subtraction pictures ($I_{obj}$). In Step S55, the background model ($I_{bg}$) is subtracted from each subtraction picture ($I_{obj}$) to obtain a plurality of pictures ($I_{mov}$). Subsequently, the moving object images can be determined by the change of object images of the plurality of pictures ($I_{mov}$). In Step S56, a gesture performed by the object can be determined according to the change of positions of the moving object images of the plurality of pictures ($I_{mov}$).

In some embodiments, the background model can be updated, and the following equation (9) can be used for updating.

$$B_{i,j}^{new} = \omega_{i,j} B_{i,j}^{old} + (1-\omega_{i,j}) P_{i,j} \quad (9)$$

where $B_{i,j}^{old}$ is pixel data of a pixel (i, j) of the original background model, $\omega_{i,j}$ is a weight number, $P_{i,j}$ is pixel data of a pixel (i, j) of a subtraction picture ($I_{obj}$), and $B_{i,j}^{new}$ is pixel data of a pixel (i, j) of an updated background model.

In some embodiments, the processor 22 can use the object images of pictures to update the background model.

In some embodiments, each pixel of the background model corresponds to the same weight number. In some embodiments, each pixel of the background model corresponds to a different weight number. In some embodiments, a portion of pixels of the background model correspond to the same weight number.

The weight number related to at least one pixel of the background model is adjustable. In some embodiments, when the processor 22 is updating the background model, the processor 22 may compare $B_{i,j}^{old}$ with $P_{i,j}$. When the difference between $B_{i,j}^{old}$ and $P_{i,j}$ is greater than a predetermined value, $\omega_{i,j}$ can be adjusted higher such that the updated background model will not be changed significantly. In one embodiment, when the difference between the pixel data of a pixel of an object image of a picture and the pixel data of a corresponding pixel of the background model is greater than a predetermined value, the processor 22 may adjust the weight number corresponding to the pixel of the object image.

In some embodiments, the image sensor 12 of the detection system 1 generates a plurality of pictures when the light source 14 is turned on and off. The processor 22 calculates a plurality of subtraction pictures using the pictures. The processor 22 determines the object image of each subtraction picture by a background model. If the processor 22 determines that the object images of the subtraction pictures are at different positions (i.e. the object is moving when the pictures are generated), the processor 22 will not update the background model with the subtraction pictures. If the processor 22 determines that the positions of the object images of the pictures are almost unchanged or the object images do not move, the processor 22 will use at least one subtraction picture to update the background model.

If the positions of two object images are not changed, it could mean that the two object images are located at the same position or the difference between the points, for example the center of gravity, representing the two object images along a direction is not greater than a percentage, for example 20%, of the width of the object image along the direction.

Figure 6:
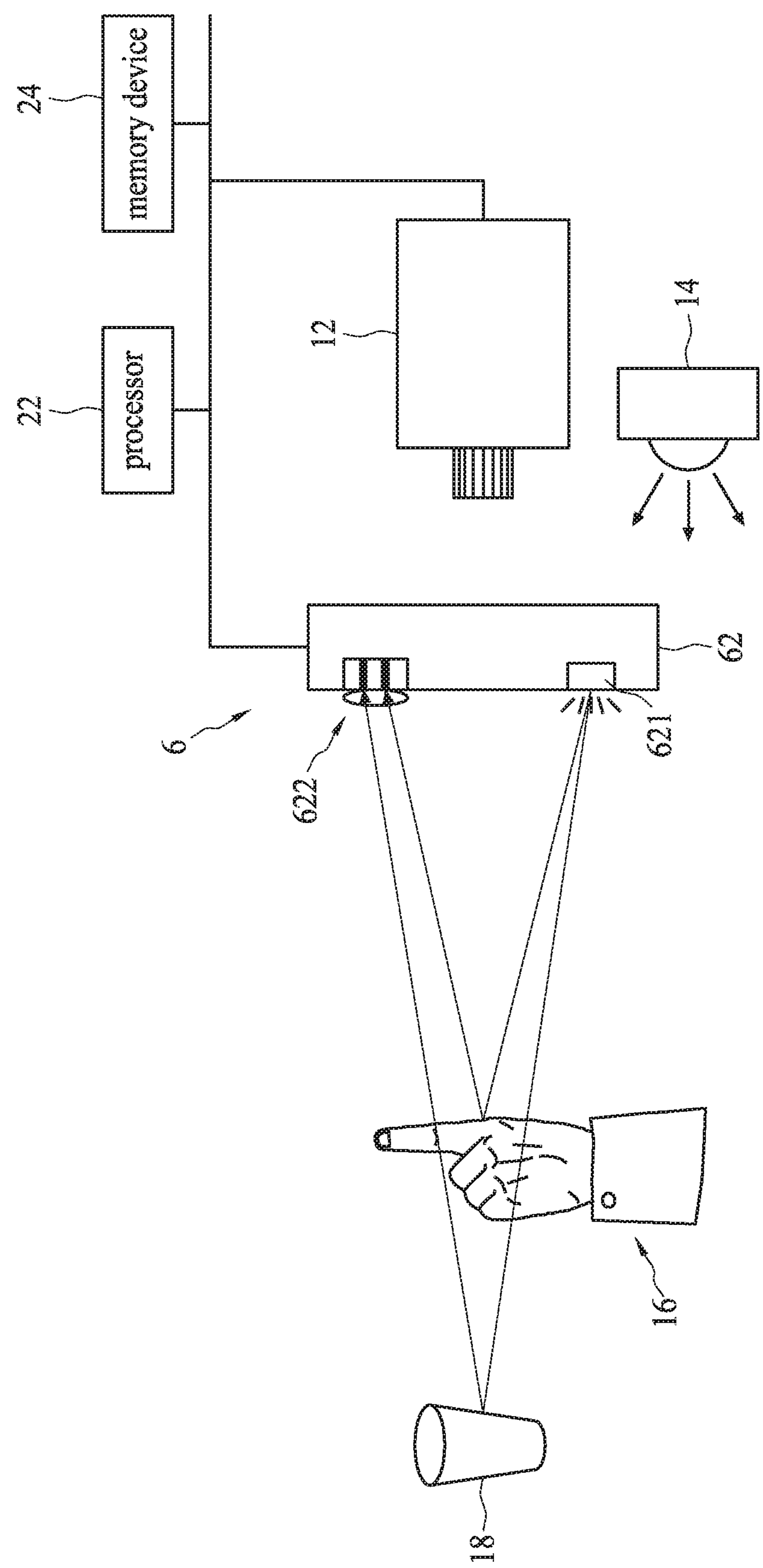
FIG. 6 schematically shows a detection system according to one embodiment of the present invention.

FIG. 6 schematically shows a detection system 6 according to one embodiment of the present invention. As shown in FIG. 6, compared with the detection system 1 of FIGS. 1A and 2, the detection system 6 further includes a distance-measuring device 62, which can measure distances between a plurality of targets and the detection system 6. The detection system 6 can determine which target is a foreground target and which target is in the background by the distances. In one embodiment, the distance-measuring device 62 can measure the distance between the object 16 and the detection system 6 and the distance between the object 18 and the detection system 6. The processor 22 uses the distances obtained by the pictures generated by the image sensor 12 to distinguish the foreground object 16 from the background object 18. In one embodiment, the processor 22 compares the distances with a predetermined value to distinguish the foreground object 16 from the background object 18, wherein the distance between the foreground object 16 and the detection system 6 is less than the predetermined value. In some embodiments, the distance-measuring device 62 is configured to measure distances by triangulation, which may include a light source 621 and a multi-pixel array 622. The distance between an object and the detection system 6 can be estimated by the location of the spot of reflected light on the multi-pixel array 622.

Figure 7:
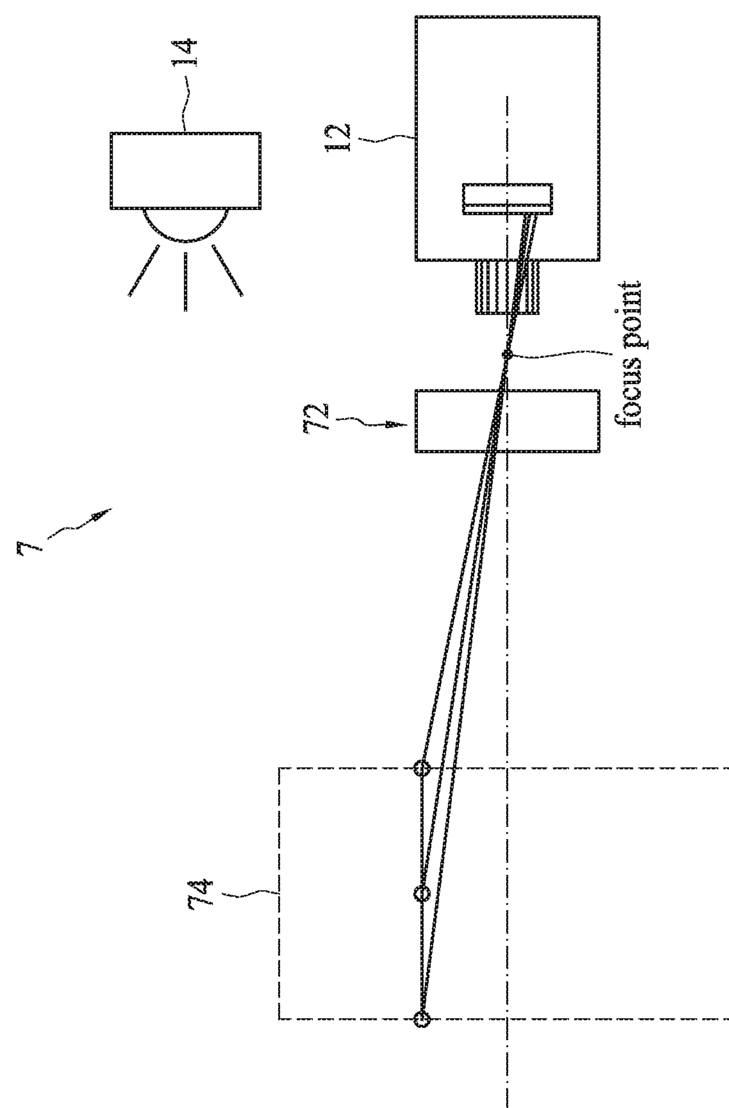
FIG. 7 schematically shows a detection system according to another embodiment of the invention.

FIG. 7 schematically shows a detection system 7 according to another embodiment of the invention. Referring to FIG. 7, compared with the detection system 1 of FIGS. 1A and 2, the detection system 7 further includes a lens device 72, which is utilized by the detection system 7 to distinguish the foreground object from the background. The detection system 7 defines a performance region 74 corresponding to the depth of field (DOF) of the lens device 72. The object in the performance region 74 can form a clear image while the object outside the performance region 74 forms a blurred image. Accordingly, with the analysis of the sharpness of images in pictures, the processor 22 can determine which object is in the performance region 74, thereby distinguishing the foreground object from the background.

Amplitude, variance, or other methods can be applied to evaluate the sharpness of the images of pictures. The details can refer to a paper by Chern N. K. et al., entitled "PRACTICAL ISSUES IN PIXEL-BASED AUTOFOCUSING FOR MACHINE VISION," Proceedings of the 2001 IEEE International Conference on Robotics & Automation, Seoul, Korea, May 21-26, 2001.

Figure 14A:
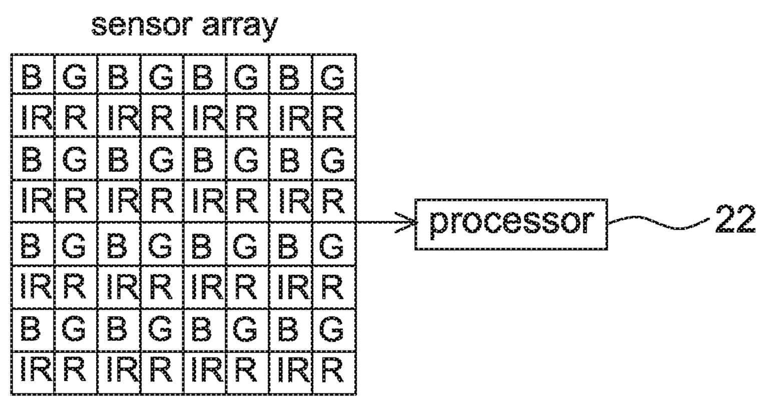
FIGS. 14A-14C are schematic diagrams of the sensor array of the color image sensor according to some embodiments of the present disclosure.
Figure 14B:
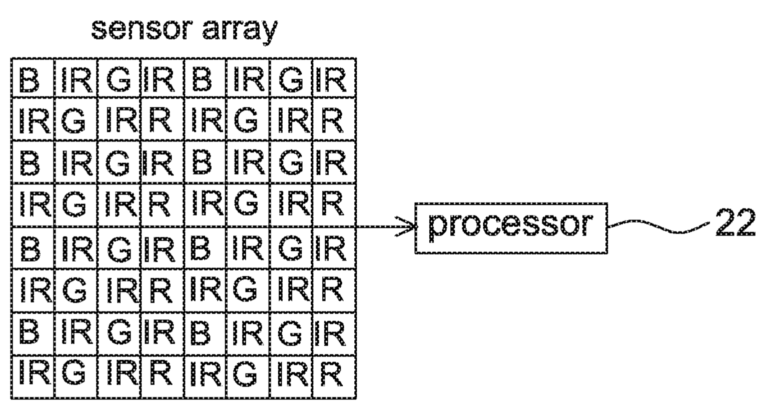
Figure 14C:
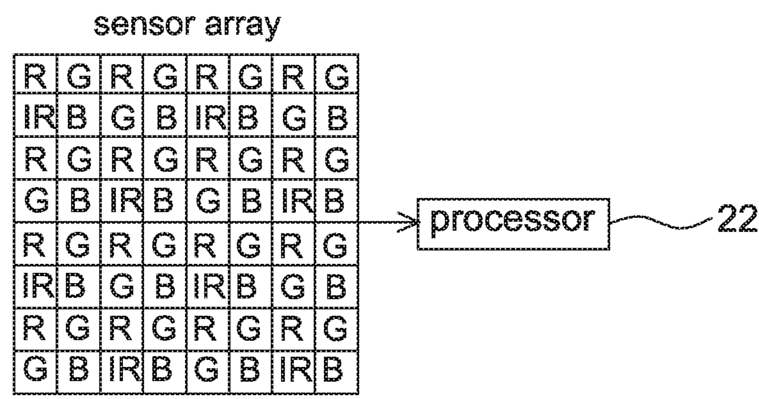
Figure 15:
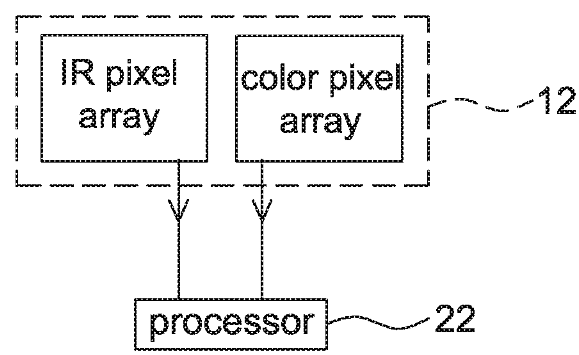
FIG. 15 is a schematic diagram of the sensor arrays of the color image sensor according to one embodiment of the present disclosure.

Referring to FIG. 1A to 2 again, in some embodiments, the image sensor 12 of the detection system 1 in FIGS. 1A and 2 is a color image sensor, which has a sensor array formed by infrared pixels (IR pixels) and color pixels as shown in FIGS. 14A-14C for example or has one infrared pixel array (IR pixel array) and one color pixel array as shown in FIG. 15 for example, configured to capture and output a picture. More specifically, in the present disclosure IR pixels and color pixels are arranged in the same sensor array or different sensor arrays of the image sensor 12. The processor 22 processes the picture received from the image sensor 12 to accordingly separate picture information of the picture from the color pixels and IR pixels and generate an IR picture and a color picture as shown in FIGS. 12A and 12B, wherein the method of generating an IR picture and a color picture according to a picture captured by a color image sensor is well known and thus details thereof are not described herein. The light source 14 in FIG. 1A may be an invisible light source, e.g. an IR light source, configured to illuminate the object to be detected. It should be mentioned that FIGS. 12A and 12B only show a part of the IR picture and color picture that contains the image 101 of FIG. 1B for illustration purpose.

For example, the color image sensor 12 includes a plurality of IR pixels for sensing IR light and a plurality of color pixels for sensing color light, e.g. RGB light. The processor 22 generates the IR picture according to the detected signals outputted by the IR pixels and generates the color picture according to the detected signals outputted by the color pixels, wherein the color picture may be the RGB color picture, HSV color picture, YUV color picture, YIQ color picture or YCbCr color picture without particular limitation. The IR picture and the color picture are saved in the memory device 24. In the present disclosure, the processor 22 determines whether to adjust the object shape in the IR picture according to the color picture.

Figure 13:
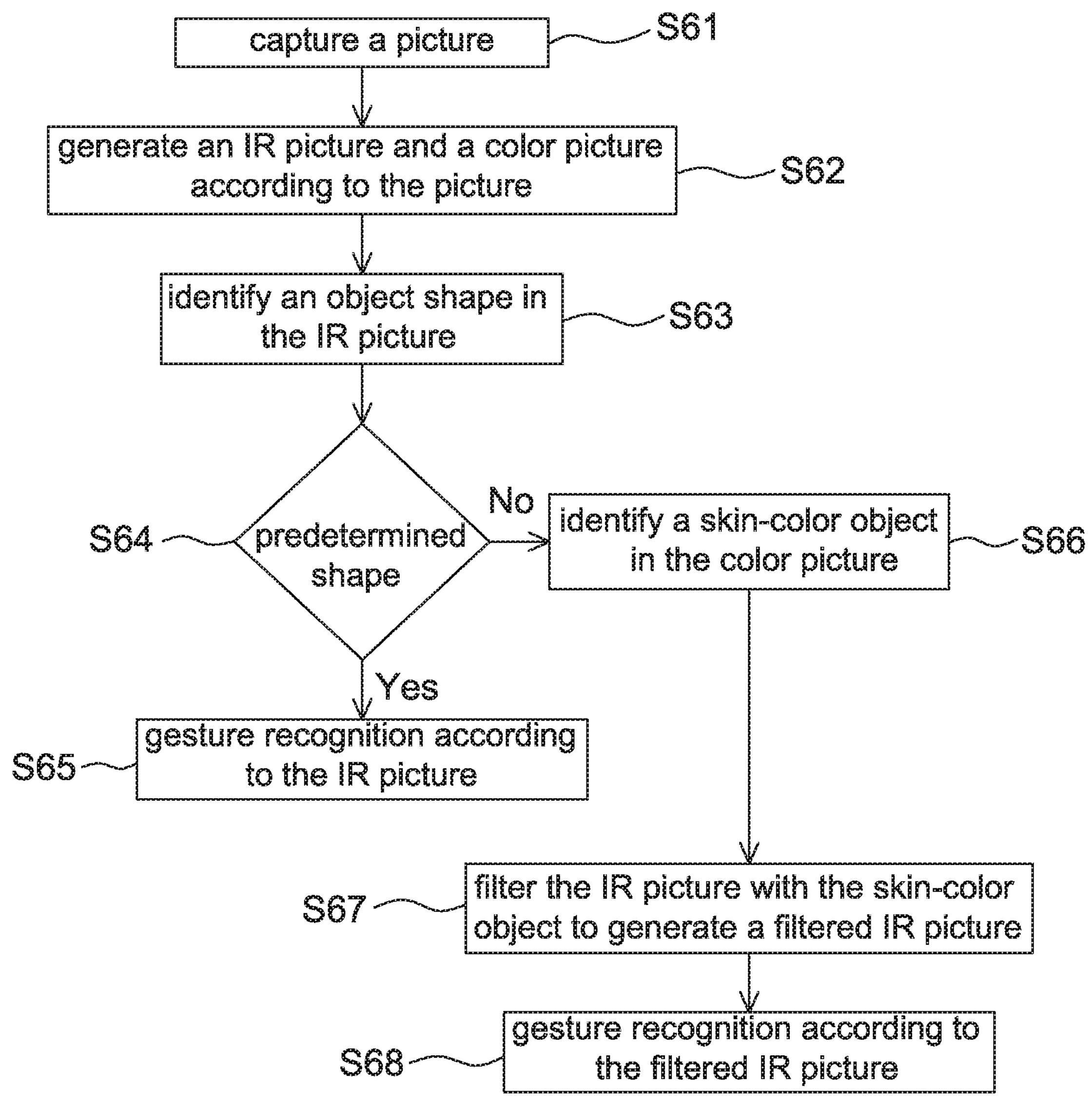
FIG. 13 is a flow chart of a gesture recognition method according to one embodiment of the present disclosure.

Referring to FIG. 13, it is a flow chart of a gesture recognition method adapted to a detection system according to one embodiment of the present disclosure. The gesture recognition method includes the steps of: outputting a picture (Step S61); generating an IR picture and a color picture according to the picture (Step S62); identifying an object shape in the IR picture (Step S63); identifying whether the object shape is a predetermined shape (Step S64); if yes, performing gesture recognition according to the IR picture (Step S65); if no, identifying a skin-color object in the color picture using a skin-color algorithm (Step S66); filtering the IR picture with the skin-color object to generate a filtered IR picture (Step S67); and performing gesture recognition according to the filtered IR picture (Step S68). Referring to FIGS. 1A-2 and 12A-13 together, details of this embodiment are described hereinafter.

Step S61: The color image sensor 12 successively captures pictures at a frame rate, and the captured picture is outputted to the processor 22 for post-processing.

Step S62: The processor 22 receives image data sensed by the IR pixels and the color pixels of the color image sensor 12, and generates an IR picture as shown in FIG. 12A and a color picture as shown in FIG. 12B according to the picture received from the color image sensor 12. It is appreciated that sizes of and images in the IR picture and the color picture are not limited to FIGS. 12A and 12B. The IR picture and the color picture are saved in the memory device 24.

Step S63: The processor 22 then identifies an object shape in the IR picture. For example, the processor 22 compares grey scale intensity of each pixel in the IR picture with a threshold and indicates those pixels having grey scale intensity exceeding or smaller than the threshold, e.g. in the IR picture of FIG. 12A pixels having grey scale intensity smaller than the threshold being indicated with a symbol "0", so as to determine an object shape (e.g. pixels not indicated by the symbol "0"). It should be mentioned that the symbol "0" is only intended to indicate that the pixel has grey scale intensity smaller than the threshold and the processor 22 may use any suitable way to indicate this comparing result, e.g. indicating pixels having grey scale intensity exceeding the threshold by the symbol "1", but not limited thereto. In FIG. 12A, the pixels not indicated by the symbol "0" are referred to an object shape in the IR image herein. It can be seen from FIG. 12A that the object shape includes the sleeve image since the sleeve is adjacent to the hand part and also illuminated by the light source 14.

Step S64: The processor 22 then compares the identified object shape in the IR image with a predetermined shape to accordingly determine whether to adjust the object shape in the IR picture according to the color picture. In this embodiment, the memory device 24 may previously store at least one predetermined shape, e.g. a shape shown in 12B without indicated by the symbol "0", but not limited thereto. The process moves to the Step S65 when the predetermined shape is matched but moves to the Step S66 on the contrary.

Step S65: When the identified object shape in the IR picture is the predetermined shape, it means that the captured image 101 is not interfered by other background or environmental images and thus the IR picture is directly used to perform the gesture recognition or object positioning or identify the object motion. In the present disclosure, as the identified object shape contains the sleeve image as shown in FIG. 12A, the identified object shape does not match the predetermined shape since the predetermined shape is assumed to contain only the hand image without the sleeve image. After entering this step, the corresponding color image saved in the memory device 24 is removed.

Step S66: When the identified object shape in the IR picture is not the predetermined shape, it means that the captured image 101 is interfered by other background or environmental images as shown in FIG. 12A, e.g. herein a sleeve image is considered as an interference. Then, the processor 22 identifies a skin-color object in the color picture as shown in FIG. 12B using a skin-color algorithm based on RGB color mode, HSV color mode, YUV color mode, YIQ color mode or YCbCr color mode, wherein the skin-color algorithm is well known and thus details thereof are not described herein. In FIG. 12B, the skin-color object is also represented by pixels not indicated by the symbol "0". As mentioned above, the processor 22 is able to distinguish the skin-color object from other part in the picture using other presentation, e.g. indicating the skin-color object by the symbol "1", but not limited thereto.

Step S67: Then, the processor 22 uses the skin-color object to filter the IR picture to generate a filtered IR picture, which contains an object image after being adjusted and the object image is used for gesture recognition or object positioning. In one embodiment, the processor 22 filters the IR image by performing an "AND operation" between the IR picture and the color picture or between the skin-color object and the object shape (e.g. in a pixel-by-pixel manner) so as to determine the object image such that the sleeve image in the IR picture is removed from the object shape in the IR picture, i.e. only pixels not indicated by the symbol "0" at corresponding pixels in the IR picture and the color picture being identified as the object image in the filtered IR picture. It should be mentioned that the "AND operation" is only one example for the Step S37, but the present disclosure is not limited thereto. By performing this step, the image 103 shown in FIG. 1B is also removed from the IR image even though the image 103 has similar intensity to the image 101 when they are illuminated by the light source 14. It should be mentioned that the IR picture and the color picture generated according to the picture received from the color image sensor 12 may have different sizes, and the processor 22 may downsize or upsize one of the IR picture and the color picture before performing the filtering step so as to allow the two pictures used in the filtering step have corresponding sizes.

Step S68: Then, the processor 22 performs the gesture recognition or object positioning according to the filtered IR image, e.g. identifying a gesture according to a plurality of object images determined according to a plurality of received pictures.

In some embodiments, when receiving a plurality of successive pictures from the color image sensor 12, the processor 22 may sometimes move to the Step S65 and sometimes move to the Step S68 according to the intensity distribution in the received pictures, such that the processor 22 may perform the gesture recognition according to IR pictures and filtered IR pictures successively generated corresponding to the received pictures.

It is appreciated that if the skin-color algorithm is used, the object for performing the gesture operation is a part of the human body. If other object is used, the algorithm is trained or previously arranged to be able to identify the specific color of the object in the color space. More specifically, the human body is not the only choice used in the preset disclosure.

In some embodiments, the picture processed by the processor 22 is a subtraction picture of at least one bright picture (e.g. the first picture in the Step S42 of FIG. 4 and the Step S51 of FIG. 5) and at least one dark picture (e.g. the second picture in the Step S44 of FIG. 4 and the Step S52 of FIG. 5) captured by the color image sensor 12. For example, the picture in the Step S61 is the subtraction picture, which replaces the picture for generating the IR picture and the color picture, obtained according to the previous embodiments so as to further increase the operation accuracy.

For example, in some embodiments the color image sensor 12 is configured to generate at least one first picture when the light source 14 is turned on and to generate at least one second picture when the light source 14 is turned off. The processor 22 is configured to compare the at least one first picture with the at least one second picture to generate a subtraction picture to be served as the picture for generating the IR picture and the color picture.

In other embodiments, the color image sensor 12 is configured to generate one first picture and two second pictures. The processor 22 is configured to subtract an average of the two second pictures from the one first picture to generate a subtraction picture to be served as the picture for generating the IR picture and the color picture.

In alternative embodiments, the color image sensor 12 is configured to generate two first pictures and one second picture. The processor 22 is configured to subtract the one second picture from an average of the two first pictures to generate a subtraction picture to be served as the picture for generating the IR picture and the color picture.

More specifically speaking, in some embodiments the processor 22 previously processes pictures received from the color image sensor 12 and then generate the IR picture and the color picture according to the pre-processed picture, e.g. the subtraction picture.

The embodied detection system can use different methods to remove the interferences caused by the background so that the determination of object images can be more accurate.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. A detection system configured to detect an object, the detection system comprising:

an image sensor comprising infrared pixels and color pixels, the image sensor configured to output a picture;

a processor configured to generate an IR picture and a color picture according to the picture received from the image sensor, wherein the IR picture contains an IR object image and the color picture contains a color object image, which corresponds to the IR object image in the IR picture, identify a skin-color object from the color object image in the color picture, and compare the identified skin-color object and the IR object image in the IR picture to remove a part of the IR object image, which does not correspond to the identified skin-color object of the color object image.

2. The detection system of claim 1, wherein the processor is configured to perform an AND operation between the IR picture and the color picture to compare the identified skin-color object and the IR object image in the IR picture.

3. The detection system of claim 1, wherein the color picture is a RGB color picture, HSV color picture, YUV color picture, YIQ color picture or YCbCr color picture.

4. The detection system of claim 1, wherein the processor is further configured to compare an object shape of the IR object image in the IR picture with a predetermined shape before identifying the skin-color object.

5. The detection system of claim 4, wherein the processor is configured to compare grey scale intensity of pixels in the IR picture with a threshold to determine the object shape.

6. The detection system of claim 1, further comprising a light source configured to illuminate the object, wherein the image sensor is configured to capture at least one first picture when the light source is turned on and capture at least one second picture when the light source is turned off, and the processor is further configured to compare the at least one first picture with the at least one second picture to generate a subtraction picture as the picture for generating the IR picture and the color picture.

7. The detection system of claim 6, wherein the image sensor is configured to capture one first picture and two second pictures, and the processor is configured to subtract an average of the two second pictures from the one first picture to generate the subtraction picture.

8. The detection system of claim 6, wherein the image sensor is configured to capture two first pictures and one second picture, and the processor is configured to subtract the one second picture from an average of the two first pictures to generate the subtraction picture.

9. A picture filtering method adapted to a detection system, the detection system comprising an image sensor which comprises infrared pixels and color pixels, the picture filtering method comprising:

outputting, by the image sensor, a picture;

generating an IR picture and a color picture according to the picture, wherein the IR picture contains an IR object image and the color picture contains a color object image, which corresponds to the IR object image in the IR picture;

identifying an object shape of the IR object image in the IR picture;

identifying a skin-color object from the color object image in the color picture when the object shape is not a predetermined shape; and filtering out a part of the IR object image, which does not correspond to the identified skin-color object of the color object image, from the identified object shape of the IR object image with the identified skin-color object.

10. The picture filtering method of claim 9, further comprising:

downsizing or upsizing one of the IR picture and the color picture before the filtering.

11. The picture filtering method of claim 9, further comprising:

comparing grey scale intensity of pixels in the IR picture with a threshold to determine the object shape.

12. The picture filtering method of claim 9, wherein the color picture is a RGB color picture, HSV color picture, YUV color picture, YIQ color picture or YCbCr color picture.

13. The picture filtering method of claim 9, wherein the filtering is to perform an AND operation between the IR picture and the color picture in a pixel-by-pixel manner.

14. The picture filtering method of claim 9, wherein the detection system further comprises a light source and the picture filtering method further comprises:

capturing, by the image sensor, at least one first picture when the light source is turned on and capturing at least one second picture when the light source is turned off; and comparing the at least one first picture with the at least one second picture to generate a subtraction picture as the picture for generating the IR picture and the color picture.

15. The picture filtering method of claim 14, wherein the image sensor captures one first picture and two second pictures, and the picture filtering method further comprises:

subtracting an average of the two second pictures from the one first picture to generate the subtraction picture.

16. The picture filtering method of claim 14, wherein the image sensor captures two first pictures and one second picture, and the picture filtering method further comprises:

subtracting the one second picture from an average of the two first pictures to generate the subtraction picture.

17. A detection system configured to detect an object, the detection system comprising:

an image sensor comprising a plurality of infrared pixels and a plurality of color pixels, and configured to capture picture information of the object; and a processor configured to separate the picture information from the plurality of infrared pixels and the plurality of color pixels, wherein the picture information from the infrared pixels contains an IR object image and the picture information from the color pixels contains a color object image, which corresponds to the IR object image in the picture information from the infrared pixels, indicate skin-color pixels among the color object image, and compare the indicated skin-color pixels and the IR object image to remove a part of the IR object image, which does not correspond to the indicated skin-color pixels of the color object image, to obtain an adjusted IR object image for gesture recognition or object positioning.

18. The detection system of claim 17, further comprising a light source configured to illuminate the object.

19. The detection system of claim 18, wherein the processor is further configured to perform subtraction between the picture information from the plurality of infrared pixels obtained when the light source is turned on and turned off respectively.

20. The detection system of claim 17, wherein the infrared pixels and the color pixels are in a same sensor array or respectively in different sensor arrays.

* * * * *